Figure 4:
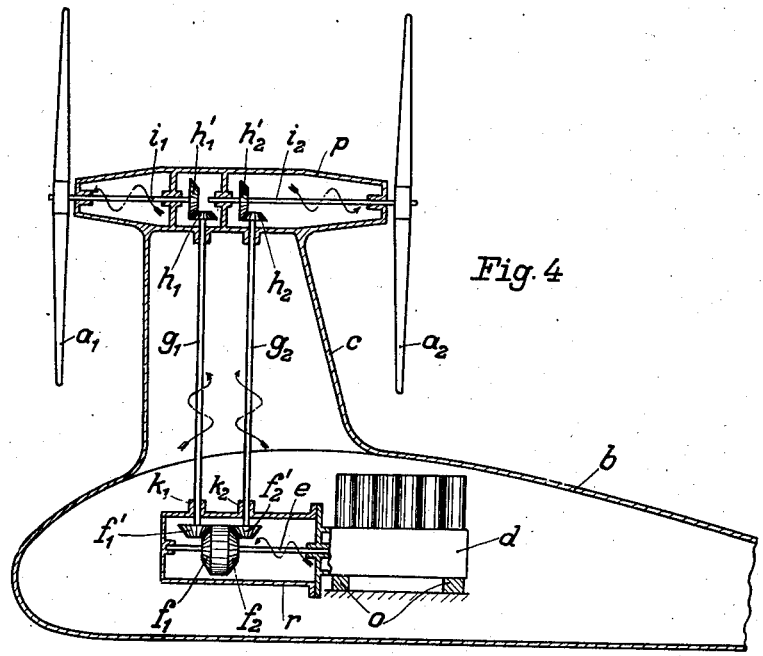

Feb. 12, 1935.  H. JUNKERS  1,990,606
SHAFTING FOR POWER TRANSMISSION
Filed Oct. 3, 1931   2 Sheets-Sheet 1
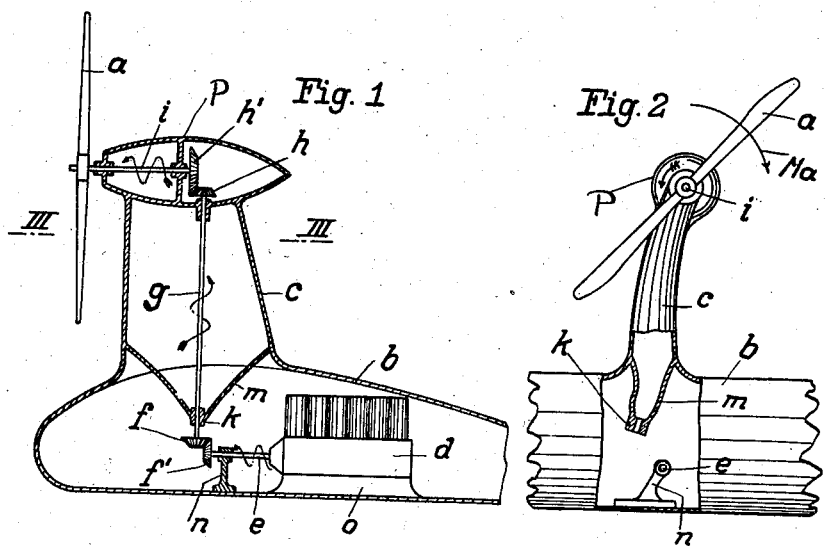
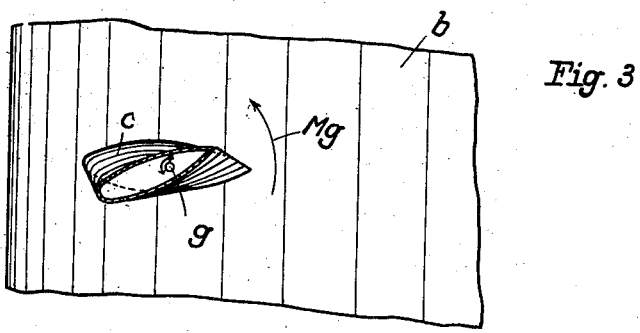
Inventor:
Hugo Junkers
by Karl...
Atty Feb. 12, 1935. H. JUNKERS 1,990,606
SHAFTING FOR POWER TRANSMISSION
Filed Oct. 3, 1931 2 Sheets-Sheet 2

Inventor:
Hugo Junkers
by Karlericchein
Atty

Patented Feb. 12, 1935

1,990,606

UNITED STATES PATENT OFFICE 1,990,606

SHAFTING FOR POWER TRANSMISSION

Hugo Junkers, Dessau, Germany, assignor to the firm: Junkers-Motorenbau G. m. b. H., Dessau, Germany Application October 3, 1931, Serial No. 566,690
In Germany, October 11, 1930

5 Claims. (Cl. 244—25)

My invention relates to shafting for power transmission. It is an object of my invention to balance the forces in the shafting. To this end I subdivide the shafting into two lines for rotation in opposite directions.

My invention will be described and illustrated as applied to the operation of aircraft propellers arranged at some distance from their engines, such as propellers arranged on outriggers and other structures which may be connected to the wings or the fuselage of an airplane or other aircraft, but it is understood that I am not limited to this or any other particular adaptation of my invention.

In mechanisms of this kind as designed heretofore the structures or the like in which the propeller or other rotary driven member is supported, are subjected to bending and torsional stress by the torque of the shafting for driving the propeller, and by the reaction torque of the propeller. Furthermore gyratory forces occur at the propeller when its axis is displaced in space, for instance, when flying in a curve or changing from horizontal to upward or downward flight, and such gyratory forces also generate torsional or bending stress on the structure. Obviously the structures and the like must be able to stand all these bending and torsional moments without undergoing excessive stress and elastic deformation. Conditions are particularly unfavorable if the structures are high, for instance in seaplanes where the engine is arranged on a float and it is necessary to arrange the propeller in as high a position as practicable so that it will be beyond reach of the waves. In such cases the structure becomes particularly heavy.

According to my invention the structures or other members connecting the energy-consuming station, in the present instance, the propeller, to the energy-producing station, in the present instance, the engine, which structures may be of any kind including wings, engine beds and the like, are relieved of the stresses from the forces and movements referred to so that substantially only fravity forces and propeller thrust act on the structures, and their weight may be reduced in proportion.

In reducing my invention to practice I provide at each power-consuming station two power-consuming members, for instance, propellers which rotate in opposite directions and absorb substantially equal torques, and for each member or propeller I provide a separate line of shafting with the shafts arranged in parallel, or substantially so, and rotating in opposite directions.

The duplicate lines need not extend throughout the power-transmitting system but at least must extend from that portion of the system in which reactions on the structures in the shape of bending or torsional stresses would occur without such duplication. In this manner the reaction and impelling torques and the gyratory moments of the two propellers are invariably generated in pairs of equal intensity but opposite directions and balance each other with regard to the structures or the like, relieving the structures from forces from the shafting.

In the drawings affixed to this specification and forming part thereof an old system of shafting and three types of shafting embodying my invention are illustrated diagrammatically by way of comparison and example.

In the drawings

Figure 5:
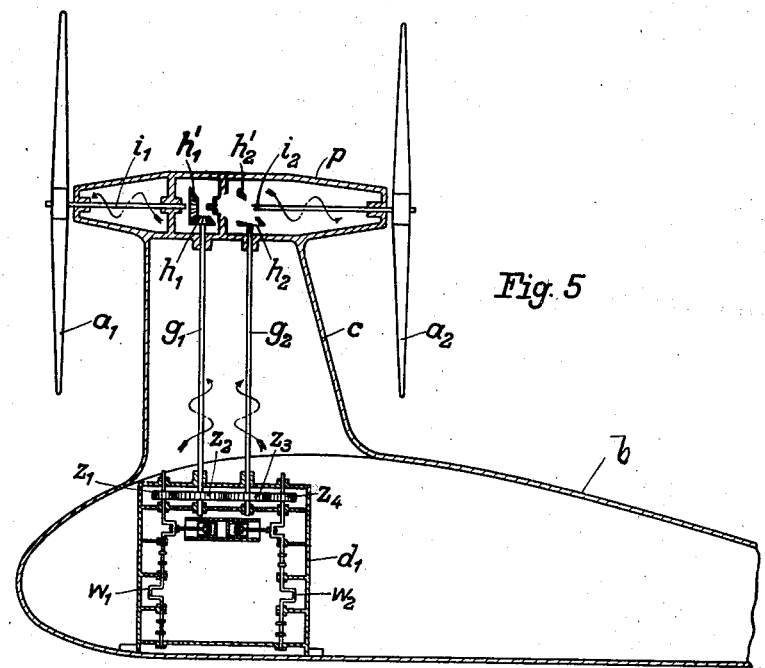

Fig. 1 is a sectional elevation of a wing with a propeller-supporting structure thereon, Fig. 2 is a partly sectional end elevation of the wing and the structure, and Fig. 3 is a section in plan on the line III—III in Fig. 1, showing the old system, Fig. 4 is a sectional elevation of a wing and a structure having two parallel shafts to which rotation is imparted by a normal reciprocating engine, Fig. 5 is a sectional elevation showing a structure which is similar to that illustrated in Fig. 4, but in which the engine is of the double-piston type.

Referring now to the drawings and first to Figs. 1 to 3, $b$ is the wing of an airplane, $c$ is a structure on the wing, and $a$ is the propeller the shaft $i$ of which is mounted to rotate in a suitable casing $p$ at the upper end of the structure $c$. $d$ is an engine arranged in the wing $b$ on a bed $o$. $e$ is its crank shaft, $n$ is a bearing for the outer end of the crank shaft, $f$, $f'$ are a pair of bevel gears arranged respectively on the crank shaft $e$ of the engine $d$ and on a vertical intermediate shaft $g$ which is mounted to rotate in a bearing $k$ of a bracket $m$ extending into the wing $b$ from the structure $c$ at its lower, and in the casing $p$ at its upper end. $h$ is a bevel gear at the upper end of the shaft $g$ and $h'$ is a bevel gear on the propeller shaft $i$ which meshes with the bevel gear $h$.

Referring to Fig. 2, $Ma$ is the reaction torque of the propeller $a$ which tends to bend the structure to the right as shown greatly exaggerated in Fig. 2. $Mg$, Fig. 3, is the impelling torque of the shaft $g$ which is transmitted to the propeller shaft $i$ through the medium of the bevel gears $h$, $h'$ and tends to twist the structure $c$ as shown also greatly exaggerated in Fig. 3. The torque of the crank shaft $e$ which is transmitted to the shaft $g$ by the bevel gears $f$, $f'$ tends to bend the bearing $n$ of the crank shaft $e$ to one side and the bearing $k$ of the vertical shaft $g$ to the other side, as shown in Fig. 2, and corresponding reaction torque acts on the engine bed $o$. Gyratory moments from the propeller when are caused by altering the direction of the flight, tend to warp or to bend the structure $c$ in a similar manner as the torques $Ma$ and $Mg$.

These drawbacks are eliminated according to my invention. Referring first to Fig. 4 the wing $b$ with the engine $d$ on the bed $o$, the structure $c$ and the casing $p$ at its upper end are provided as described with reference to Figs. 1 to 3, but in this instance two propellers $a_1$ and $a_2$ are mounted to rotate at opposite ends of the casing $p$ on shafts $i_1$ and $i_2$, respectively.

$r$ is a frame which is secured to the crank case of the engine $d$ and is equipped with a bearing for supporting the rear end of the crank shaft $e$. $f_1$ and $f_2$ are bevel gears on the crank shaft $e$ which mesh with bevel gears $f_1'$ and $f_2'$ on parallel vertical shafts $g_1$ and $g_2$, respectively, the lower ends of which rotate in bearings $k_1$, $k_2$ in the frame $r$. The shaft $g_1$ is connected to the shaft $i_1$ of the propeller $a_1$ by bevel gears $h_1$ and $h_1'$ and the shaft $g_2$ is connected to the shaft $i_2$ of the propeller $a_2$ by bevel gears $h_2$ and $h_2'$. By these means rotation in opposite directions is imparted to the shafts $g_1$ and $g_2$ and to the shafts $i_1$ and $i_2$, as indicated by the arrows. The torques on the shafts $g_1$ and $g_2$ are equal but opposite and therefore balance each other with respect to the structure $c$ so that there is no longer any twisting of the structure. Similarly the reaction torques of the oppositely rotating propellers $a_1$ and $a_2$ balance each other so that the only forces acting on the structure $c$ are gravity and propeller thrust.

The frame $r$ with the bearings for the crank shaft $e$ and for the vertical shafts $g_1$ and $g_2$ is rigidly connected to the crank case which prevents the transfer of torques or bending moment to the frame of the airplane. As the engine $d$ and the frame $r$ which constitute a single driving unit, transfer to the outside two equal but oppositely directed torques, there will be no longer any reaction torques acting to the outside and all members arranged intermediate the engine bed $o$ and the propellers for connecting the engine bed to the propeller bearings, and the engine bed itself, are free of any additional stresses by reaction and impelling torques, and gyratory moments.

Referring to Fig. 5, this arrangement is substantially similar to the arrangement described with reference to Fig. 4, with the exception of the engine. This engine $d_1$ has two crank shafts $w_1$ and $w_2$ which are connected by a train of spur gears $z_1$, $z_2$, $z_3$, $z_4$, the oppositely rotating spur gears $z_2$ and $z_3$ being secured on the lower ends of the shafts $g_1$ and $g_2$. This arrangement, like that illustrated in Fig. 4, is without outside torques.

I wish it to be understood that I do not desire to be limited to the exact details of construction shown and described for obvious modifications will occur to a person skilled in the art.

I claim:—

1. In an aircraft, a plane body carrying a motor provided with a crank shaft, a housing mounted above said plane body and connected with said body by means of an enclosed structure, propeller shafting mounted in said housing and counter shafting mounted in said enclosed structure, the said counter shafting serving to drive said propeller shafting from said crank shaft and comprising two substantially parallel shafts connected to rotate in opposite directions, thereby neutralizing the torques and gyroscopic moments of said counter shafting with respect to said enclosed structure.

2. In an aircraft, an engine provided with at least one crank shaft, two propellers provided with shafts in axial alignment with each other but out of axial alignment with said crank shaft, two substantially parallel counter shafts driving said propeller shafts from said crank shaft; the two said propellers and propeller shafts, as well as the two said counter shafts rotating in opposite directions; the torques and gyroscopic moments of said counter shafting being thus neutralized with respect to the structure of said aircraft.

3. In an aircraft, a plane body carrying an engine provided with a crank shaft, a housing above said plane body and an enclosed structure connecting said housing with said plane body, two propellers mounted forwardly and rearwardly of said housing, propeller shafts mounted within said housing and two counter shafts connecting said crank shaft with said propeller shafts mounted within said enclosed structure; the two propellers and propeller shafts, as well as the two counter shafts being connected to rotate in opposite directions; the torques and gyroscopic moments of said counter shafting being thus neutralized with respect to the structure of said aircraft.

4. In an aircraft, an engine, propeller shafting, counter shafting and crank shafting, a framework rigidly attached to the crank case of said engine, at least one bearing for a crank shaft mounted on said framework, two substantially parallel counter shafts driven by said crank shaft in opposite directions and serving to drive said propeller shafting, bearings for said counter shafts mounted on said framework and gearing connecting said crank shaft and said counter shafts mounted within said framework.

5. In an aircraft, an engine provided with two crank shafts, two propellers provided with shafts in axial alignment, two substantially parallel counter shafts serving to drive said propeller shafts from said crank shafts with substantially equal torques, the two said propeller shafts, the two said counter shafts and the two said crank shafts rotating in opposite directions, thereby neutralizing the torques and gyroscopic moments of said shafting with respect to the structure of said aircraft.

HUGO JUNKERS.